US012617223B2

(12) United States Patent
Vignolo et al.

(10) Patent No.: US 12,617,223 B2
(45) Date of Patent: May 5, 2026

(54) PLANT AND PROCESS FOR PRE-COATING AND PRINTING ON METALLIC STRIPS

(71) Applicant: DANIELI & C. OFFICINE MECCANICHE S.P.A., Buttrio (IT)

(72) Inventors: Luciano Vignolo, Udine (IT); Michele Chiappa, Turin (IT)

(73) Assignee: DANIELI & C. OFFICINE MECCANICHE S.P.A., Buttrio (IT)

( * ) Notice: Subject to any disclaimer, the term of this patent is extended or adjusted under 35 U.S.C. 154(b) by 185 days.

(21) Appl. No.: 18/553,446

(22) PCT Filed: Mar. 31, 2022

(86) PCT No.: PCT/IB2022/052994
§ 371 (c)(1),
(2) Date: Sep. 29, 2023

(87) PCT Pub. No.: WO2022/208418
PCT Pub. Date: Oct. 6, 2022

(65) Prior Publication Data

US 2024/0359497 A1 Oct. 31, 2024

(30) Foreign Application Priority Data

Apr. 1, 2021 (IT) ........................ 102021000008324

(51) Int. Cl.
*B41J 11/00* (2006.01)
*B41J 3/413* (2006.01)
(Continued)

(52) U.S. Cl.
CPC ............ *B41M 5/0017* (2013.01); *B41J 3/413* (2013.01); *B41J 11/0022* (2021.01);
(Continued)

(58) Field of Classification Search
CPC ...... B41J 3/413; B41J 11/42; B41J 11/00015; B41J 13/08; B41M 5/0017; B41M 5/0047; B41M 5/0058
See application file for complete search history.

(56) References Cited

U.S. PATENT DOCUMENTS 5,939,197 A 8/1999 Blohowiak et al.
5,995,264 A 11/1999 Sherman et al.
(Continued)

FOREIGN PATENT DOCUMENTS

AT 516829 B1 9/2016
CN 101791901 A 8/2010
(Continued)

OTHER PUBLICATIONS

Takaku, MachineTranslationofWO-2022102058-A1, 2022 (Year: 2022).*
(Continued)

*Primary Examiner* — Scott A Richmond
(74) *Attorney, Agent, or Firm* — Tutunjian & Bitetto, P.C.

(57) ABSTRACT

The invention relates to a plant and a process for pre-coating and subsequent digital sol-gel inkjet printing on metallic strips, wherein on the dried ink a protective clear coat will then be applied. The core of the invention lies in the fact that printing is of the sol-gel ink type and pre-coating is no longer carried out by the separate application of two coats, a primer and a base coat, with relative drying and cooling phases of the coats, but by the application of a single coat that combines the functions of primer and base coat. In addition, printing with a special sol-gel type ink that does not require UV treatment, but only a simple drying of the ink after application, simplifies the process even further.

12 Claims, 3 Drawing Sheets

(51) Int. Cl.

| | |
|---|---|
| ***B41J 15/04*** | (2006.01) |
| ***B41J 15/16*** | (2006.01) |
| ***B41J 29/377*** | (2006.01) |
| ***B41M 5/00*** | (2006.01) |
| ***B41M 7/00*** | (2006.01) |

(52) U.S. Cl.

CPC .......... *B41J 11/008* (2013.01); *B41J 11/0095* (2013.01); *B41J 15/046* (2013.01); *B41J 15/165* (2013.01); *B41J 29/377* (2013.01); *B41M 5/0047* (2013.01); *B41M 5/0058* (2013.01); *B41M 7/009* (2013.01)

(56) References Cited

U.S. PATENT DOCUMENTS

| | | | | |
|---|---|---|---|---|
| 2007/0085983 | A1 * | 4/2007 | Ko | B41J 11/0015 355/28 |
| 2007/0089979 | A1 * | 4/2007 | Veltri | B05D 3/14 204/164 |
| 2010/0188469 | A1 * | 7/2010 | Ikegami | B41J 11/0022 347/102 |
| 2015/0227111 | A1 * | 8/2015 | Ikeda | G03G 15/6573 399/94 |
| 2018/0272694 | A1 * | 9/2018 | Gohda | B41J 2/04586 |
| 2019/0241000 | A1 * | 8/2019 | Castells De Monet | G01B 5/06 |
| 2020/0031146 | A1 * | 1/2020 | Puttini | B65H 23/188 |
| 2020/0231831 | A1 * | 7/2020 | Tsuji | C09D 11/107 |
| 2021/0117744 | A1 * | 4/2021 | Finn | G06K 19/07769 |

FOREIGN PATENT DOCUMENTS

| | | | | |
|---|---|---|---|---|
| CN | 110588181 | A | 12/2019 | |
| DE | 102015118841 | A1 | 11/2015 | |
| EP | 3085632 | A1 | 10/2016 | |
| EP | 4001366 | A1 * | 5/2022 | C08L 83/06 |
| IT | 102018000007488 | | 1/2020 | |
| JP | 2011116873 | A | 6/2011 | |
| JP | 2017047370 | A | 3/2017 | |
| WO | 2019141712 | A1 | 7/2019 | |
| WO | WO-2022102058 | A1 * | 5/2022 | B41J 2/1707 |

OTHER PUBLICATIONS

International Search Report for PCT/IB2022/052994 dated Jul. 8, 2022 (4 pages).

First Office Opinion Notice issued in corresponding CN Application No. 202280025343.6 dated Jun. 26, 2025 (7 pages) (with English Translation).

Search Report issued in corresponding CN Application No. 202280025343.6 dated Jun. 23, 2025 (3 pages) (with English Translation).

* cited by examiner

PLANT AND PROCESS FOR PRE-COATING AND PRINTING ON METALLIC STRIPS

TECHNICAL FIELD

The present invention relates to a printing plant and process, in particular for digital inkjet printing, for pre-coated strips, and in particular to the arrangement of a printing process in-line with pre-coating to prepare the surface of the product for printing, making it suitable for ink adhesion.

BACKGROUND ART

Pre-coated strips have a variety of applications and are widely used in the field of indoor and outdoor architecture, in civil and industrial construction and in the household appliance industry. There is a rising demand in this sector for strips with increasingly complex decorative designs.

The usual technique for producing these pre-coated strips with complex designs involves the following steps, illustrated with reference to the attached FIG. 1:

The first step sees the application of a first coat, the primer 10, followed by the drying 12 and subsequent cooling 14 of said primer; the second step involves the application of a second coat 16, that is, the base coat, which constitutes the background of the design to be obtained, followed by drying 18 and subsequent cooling 20 of the coats. In a third step, there follows the application of the design or the print 22, for example using thinned or unthinned inks with a solvent on the base coat of the previously created double coat, with the subsequent drying of the ink, and finally, in a fourth step, the application of a clear coat 24 also followed by drying 26 and subsequent cooling 28. The various steps listed above are reflected in a succession of devices in the pre-coating and printing plant, which precisely follow one another in this order: a first coating device, a first oven, a first cooling device, a second coating device, a second oven, a second cooling device, a printer, a third coating device, a third oven and a third cooling device. The flowchart of FIG. 1 therefore represents, on the one hand, the succession of the processing steps and, on the other, the succession of the corresponding devices required to carry out each individual step in a plant or corresponding line for pre-coating and printing.

Ink application or printing technologies have evolved technically and technologically over time, but the following techniques are generally used today:

Application with printing rollers (rotogravure), usually consisting of two to five rollers, with a negative design imprinted on the roller; application with printing rollers by flexographic technique, usually consisting of a unit of two to five rubber-coated rollers with an embossed (positive) design on the rubber surface; and application with a four-colour digital inkjet printer. All technologies have their limits. In particular, there is a common disadvantage to all state-of-the-art technologies: The application of two coats (primer+base coat) before printing entails an increase in operating costs and a complexity in the arrangement of the pre-coating and printing plant, imposing the need to operate by using three drying or heating ovens for the three coats (primer+base coat+clear coat).

The disadvantages associated with the roller application are as follows: The design is constrained by the circumferential development of the roller used. Each design involves the use of a dedicated series of rollers; therefore, the cost of investment is high and the management of a product portfolio with numerous designs to be produced is particularly complex.

In relation to the current state of the art, application using digital printing has other drawbacks such as: Solid-state, solvent-free UV inks have reduced heat resistance, reduced flexibility and reduced resistance to external environmental conditions. In the event of leakage, UV ink has a greater environmental footprint and is much more expensive to handle. Curing or heat drying of the ink takes place in the printing machine which has integrated UV lamps. State-of-the-art documents disclosing ink printing on metal substrates are JP 2017 047370 A and US 2007/0085983 A1.

SUMMARY OF THE INVENTION

The object of the invention is to overcome the aforementioned drawbacks and to propose, in view of the limitations of the various techniques and technologies for pre-coating and printing on metallic strips, a plant and process for pre-coating and printing on metallic strips, which is less complex, requires fewer components, is cheaper, and preferably provides higher print resistance with a lower environmental footprint.

Further objects or advantages of the invention will become apparent from the following description.

In a first aspect of the invention, the object is achieved by means of a plant for pre-coating and printing, by digital inkjet, of a metallic strip, comprising, in the following order:

(a) a first coating device for applying a combined coat that serves as both a primer and a base coat;
(b) a first oven for drying the coat;
(c) a first cooling system, such as an air and water cooling system;
(d) a digital sol-gel type inkjet printing unit, preferably with an ink drying device;
(e) a second coating device, in particular a roller applicator, for applying a clear coat;
(f) a second oven for drying the coat; and
(g) a second cooling system, such as an air and water cooling system.

Said plant, which provides for the application of a single coat that performs the simultaneous functions of primer and base coat, eliminates the need, before printing, of two drying ovens, two cooling devices and two coating devices, thus halving the number of components in the pre-coating step. The invention makes it possible to create a pre-coating and printing line that requires only two ovens for heat drying or curing the coats, the first being necessary for the drying and thus polymerization of the initial coat, which acts as a primer and a base coat, and the second, placed after the printing unit and the application of the clear coat, being necessary for the drying/polymerization of the latter.

The plant according to the invention is particularly suitable for printing on continuous strips. In this regard, the plant advantageously also comprises means for conveying the strip through the various components of the plant itself. In order not to compromise the definition of the printed image during its movement through the printing unit, it is advisable to centre the strip to be printed and maintain a defined strip tension. In this regard, in a preferred embodiment of the invention, the printing unit comprises, in the following order:

(d-1) one or more digital sol-gel type inkjet print heads;
(d-2) an ink drying oven;
(d-3) a third cooling system;

wherein upstream of said one or more of print heads is provided a centring system and a first strip tension control system, in particular comprising, in the following order:

(d-4) a rough strip centring system;

(d-5) a first "S-like" bridle system for controlling strip tension;

(d-6) a fine strip centring system;

(d-7) pass-line rollers and, optionally, deflectors;

and that downstream of said one or more of print heads is provided a second strip tension control system, in particular:

(d-8) a second "S-like" bridle system.

The strip tension control system is preferably an "S-like" bridle system. A possible "S-like" bridle system for controlling strip tension can be provided at the entrance of the clear coating device.

The pass-line rollers limit the vertical vibrations of the strip.

Advantageously, the strip to be printed is guided through said centring system and said first strip tension control system to be subsequently guided underneath said one or more print heads, here advantageously transported by means of a conveyor belt, and then guided to the outlet of the printing unit through said second strip tension control system. The conveyor can advantageously be provided with a pneumatic support surface adapted to sustain the corresponding section of the strip on an air cushion. The bridle systems virtually cancel out the tension in the longitudinal direction of the strip. Strip levelling systems placed before said one or more print heads are also conceivable. Such a strip centring and tension system is described, for example, in patent application IT 102018000007488.

In a preferred embodiment of the invention, the plant further comprises, in the printing unit, a strip position sensor, while the print head(s) is/are mounted onto a slide that can translate orthogonally to the direction of the strip's motion and wherein the plant comprises a corresponding control unit configured to manage the movement of the slide according to the values as detected by the position sensor to compensate for the lateral deviation of the strip's position as measured by the position sensor.

In order to optimize the application of the clear coat, the plant according to the invention comprises, in an embodiment of the invention, furthermore downstream of the printing unit and upstream of the second coating device, a strip temperature sensor, in particular a temperature transducer, adapted to measure the temperature of the strip and send the measured value to a corresponding control unit configured to control automatically the speed of the strip and/or the flow rate of the third cooling system to bring the temperature measured by the temperature sensor back within predetermined values. Advantageously such a control unit is the same that manages the movement of the above slide and the same that controls all the components of the pre-coating and printing plant. To control the slide, which can support one or more print heads, and the strip's temperature, different first and second control units are also conceivable.

A second aspect of the invention relates to a process for pre-coating and printing, in particular digital jet printing, of a metallic strip, comprising the following steps, in the order indicated:

(I) application of a combined coat layer, that serves as both a primer and a base coat, onto a metallic strip;

(II) heat drying of the combined coat;

(III) cooling of the combined coat;

(IV) digital sol-gel type inkjet printing of the pre-coated strip and drying of the ink;

(V) application of a clear coat onto the pre-coated and printed strip;

(VI) heat drying of the clear coat; and (VII) cooling of the clear coat.

In order not to compromise the definition of the print image, in a preferred embodiment of the invention said strip is centred before step (IV). Advantageously, before and after step (IV) the strip is tensioned, in particular using a plant as defined in the second claim.

In a preferred embodiment of the process according to the invention, the combined coat is polyester-melamine based and, once dried, makes it possible to obtain perfect ink adhesion from the digital jet printing.

The combined polyester-melamine coat is advantageously white in colour. The coat intended for application onto the strip preferably has a viscosity of between 60 and 90 seconds measured according to DIN Standard 53211. The latter standard requires a flow cup with a capacity of 100 $cm^2$ and an outlet hole of 4 mm. At an ambient temperature of 20° C., the test liquid drains completely through the hole and the drainage time is determined. The unit of measurement is the second DIN Standard. The density advantageously is in the range 1000-1500 $kg/m^3$, determined according to the methods illustrated in DIN EN ISO 2811-1-4. Preferably, the combined coat is applied with a final (dried) thickness of 5 to 15 μm.

The combined coat is a type of "adhesion promoter", more commonly known as an adhesive, that prepares (alters) the surface of the material on which printing is to be carried out, so that the ink adheres to it, and at the same time is adapted to adhere, without pre-coating, to the substrate that can be of various kinds, such as metal, plastic, glass and other substrates that are difficult to print, thus acting simultaneously as a primer and base coat. The market offers a wide range of combined coats, from among which the person skilled in the art can choose the one best suited to the substrate and the ink he/she intends to use.

An ink of the sol-gel type avoids the use of UV lamps for drying and does not require the use of environmentally unfriendly solvents. It is an ink technology that overcomes the limitations of inks currently used and simplifies ink drying. A suitably developed ink for this application is preferably a silane-based thermal polymerization product. Advantageously, the ink uses an ecological solvent that reduces the ink's environmental footprint. In a preferred variant thereof, the ink is characterized by a dynamic viscosity at 25° C. of 6-10 cps determined according to ASTM D 4040/4207 and preferably by a density of between 0.9 and 1.0 g/ml determined according to ISO 12647-3. The ink can be made in the following colours for printing: black, cyan, magenta and yellow.

The sol-gel process is one of the methods used for creating films like ink-films applied with an inkjet printer. A sol-gel type ink comprises colloidal solutions (sol) that constitute the precursors for the subsequent formation of a gel (continuous inorganic lattice containing an interconnected liquid phase) through hydrolysis and condensation reactions. Thermal post-treatments of drying and solidification are generally used to remove the liquid phase from the gel, promote further condensation and increase mechanical properties. Typical precursors for the sol-gel process occur in the form of $M(OR)_n$, $MX_n$, $R'\text{-}M(OR)_{n-1}$, where M represents a metallic centre and X and RO are instead common leaving groups present in metal salts or metal alkoxides, such as the chloride anion in metal halides, while R' is any organic group bound to the metallic centre via covalent bonds (Si—C, Sn—C) or coordination binders (M=Ti, Zr . . . ). The ink industry offers a large selection of sol-gel type inks for various media, among which the expert can easily identify the one that best suits his/her needs.

To ensure the durability of the printed product, a clear coat compatible with the printed surface is applied over the layer of dried ink. Suitable coatings are commercially available and readily identifiable by the person skilled in the art. In a preferred embodiment of the invention, the clear coat is a HD (high-density) polyester. HD polyesters have excellent resistance to the external environment and to chemicals. The clear coat layer preferably has at least one of the following characteristics: a viscosity between 80-120 s (measured according to DIN 53211), a solid content by weight >50% (measured according to UNI EN ISO 3251), and a density in the range of 1000-1500 kg/m$^3$ (measured according to DIN EN ISO 2811-1/2/3/4). The final (dried) thickness applied advantageously corresponds to 10-25 μm.

To optimize the printing and quality of the printed design, a measurement of the position of the strip preferably takes place prior to step (IV), and during step (IV) the position of the print heads is adjusted in order to optimize the application of ink onto the strip based on the measurement of the strip's position.

For the purposes of perfecting the application of the clear coat onto the print, advantageously the process according to the invention provides, in an embodiment thereof, that, after step (IV), the temperature of the strip is monitored and that, if the temperature exceeds a limit value, the speed of the strip is slowed down and/or the drying of the ink is enhanced in order to regulate said drying before application of the clear coat in step (V).

The printing unit can be advantageously equipped with auxiliary systems for ink recirculation and cleaning or washing of the nozzles of the print heads.

The features and advantages disclosed for one aspect of the invention may be transferred mutatis mutandis to the other aspect of the invention.

The industrial applicability is obvious from the moment the pre-coating and printing plant requires fewer components, becomes less complex, and processing becomes cheaper and more and environmentally friendly.

Said purposes and advantages will be further highlighted in the disclosure of preferred examples of embodiments of the invention given by way of non-limiting example only.

Variant and further features of the invention are the subject matter of the dependent claims. The disclosure of preferred examples of implementation of the plant and process for pre-coating and printing of strips according to the invention, and of auxiliary systems for guiding the strip, controlling its specific tension and centring it, is given by way of example only with reference to the attached drawings. In particular, unless otherwise specified, the number, shape, size and materials of the system and of the individual components may vary, and equivalent elements may be applied without deviating from the inventive concept.

DETAILED DESCRIPTION

Figure 1:
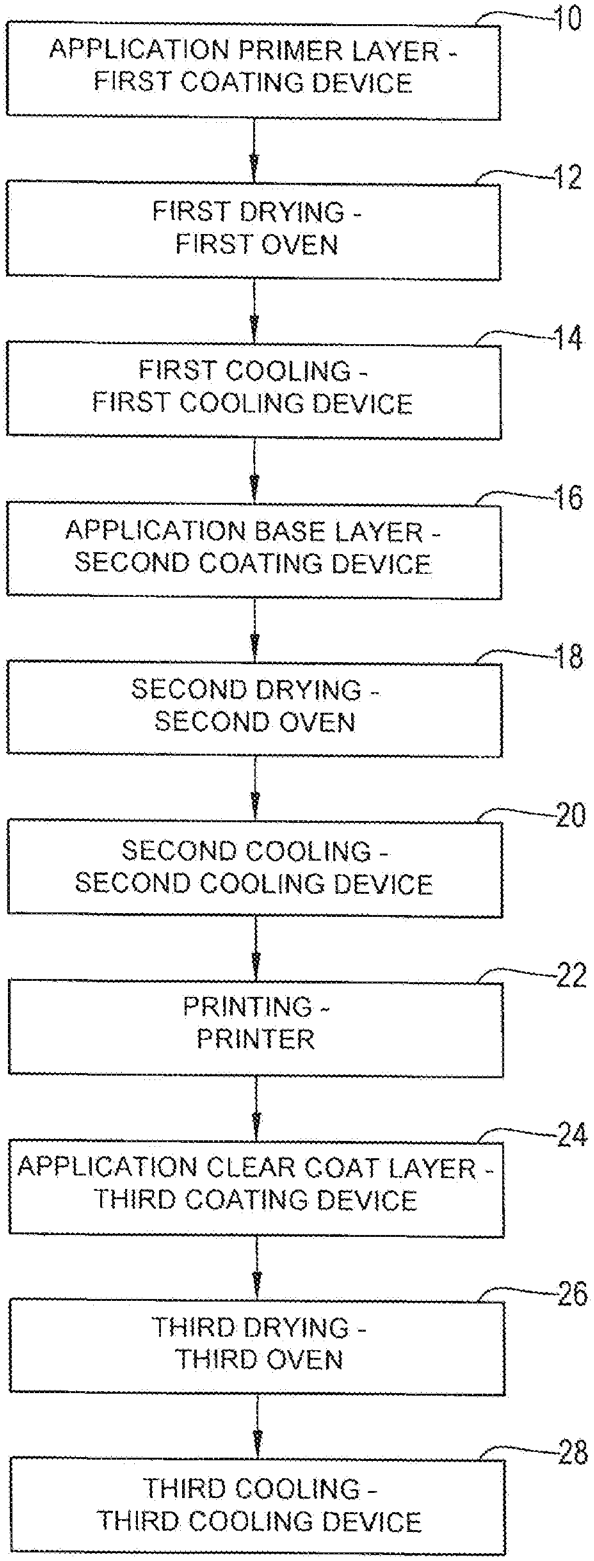
(PRIOR ART) FIG.1
FIG. 1 represents in a block diagram the state of the art for the realization of a print on a pre-coated strip, in particular the various steps of the process and the devices necessary to realize each of them.
Figure 2:
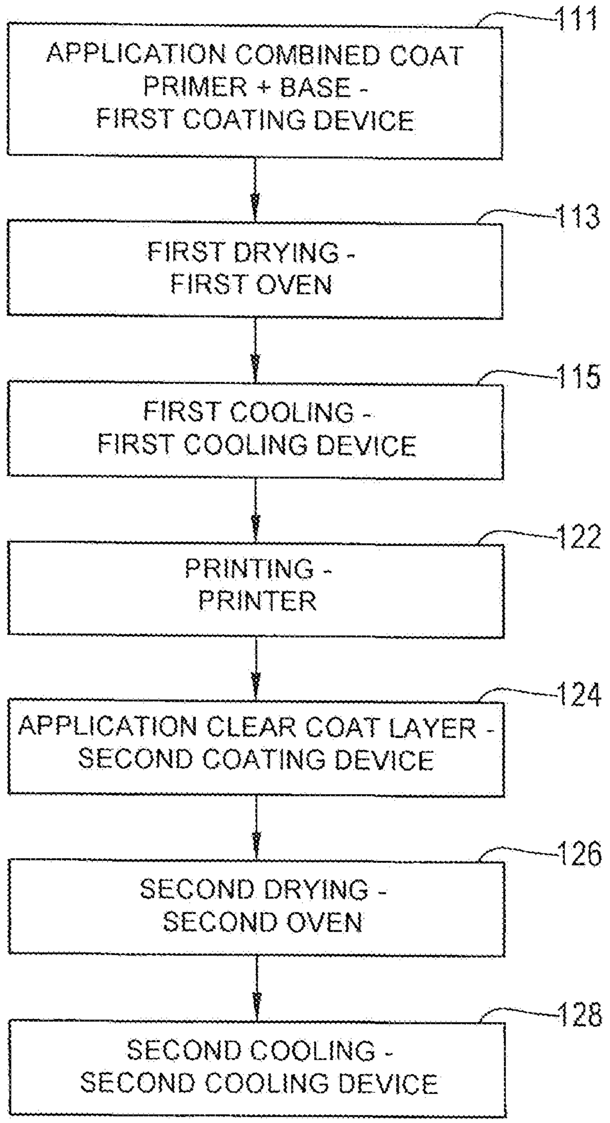
FIG. 2 represents in a block diagram an embodiment of the system and method for coating and printing a strip according to the invention.

FIG. 1 was discussed at the outset with reference to the state of the art. FIG. 2 depicts a block diagram of one embodiment of the invention for making a jet print on a strip. The beginning of the process sees the application of a double coat consisting of a primer and a base coat 111 in a single step. Subsequently, the combined coat 113 is dried and then cooled 115. Printing 122 is then executed on the coat. As in the state of the art, printing 122 is followed by the application of a clear coat 124, its drying 126 and then its cooling 128. Cooling is by air and water. Idle support roller systems and deflectors can guide the strip towards the digital printing section.

Each step is connected to a corresponding device adapted to perform that step, and precisely in this order: a first coating device for applying the combined coat; a first oven for drying the coat; a first cooling device; the printer; the second coating device for applying a clear coat, preferably with a roller applicator; a second oven; and a second cooling device. FIG. 2, as FIG. 1, represents both the sequence of steps of an embodiment example of the process according to the invention and the order of the devices in an embodiment example of the plant according to the invention.

Figure 3:
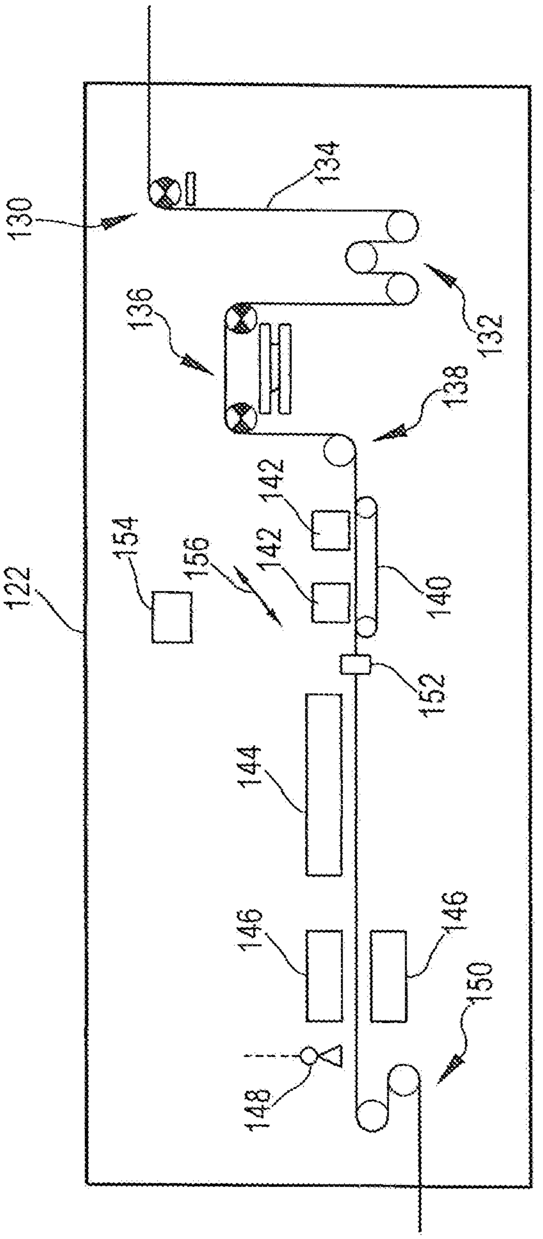
FIG. 3 is a detailed schematic view of the section of a digital inkjet print of the plant according to the invention.

With reference to FIG. 3, a preferred embodiment of an inkjet printing section and related auxiliary systems representing the printing unit for performing the printing phase 122 is illustrated.

At the inlet of the printing unit 122 is a rough strip centring device 130 followed by an "S-like" bridle system 132 for controlling tension of the strip 134. Downstream there follows a fine strip centring device 136 and subsequently pass-line rollers 138 and deflectors (not shown) and a conveyor belt 140. Above the belt conveyor 140 is a plurality of digital inkjet print heads 142. An oven 144 for drying the ink then follows. For cooling of the strip 134 a strip cooling system 146 is needed. To verify that the strip 134 has a suitable temperature to apply the protective clear coat, a probe 148 to measure the temperature of the strip is foreseen before the coating rollers that apply the clear coat (FIG. 2). The printer unit 122 ends with an additional "S-like" bridle system 150 at the output of the printing section to control the tension applied to the strip 134.

A possible variant may provide for the addition of a strip position sensor 152 placed after the digital inkjet print heads 142. Said sensor measures the possible deviation of the strip 134 with respect to the centre of the line. In a further embodiment, the deviation measurement is sent to a control unit 154 that controls the transverse movement 156 of a slide (not shown) onto which the print heads 142 are mounted so as to compensate for any lateral displacement.

In a further embodiment, the temperature of the strip measured by a temperature transducer 148 is sent to the line controller 154 which, in the event that the strip's 134 temperature exceeds what is considered to be the limit, intervenes by modifying the process speed and the capacity of the cooling system 146 so as to bring the strip's temperature 134 within the limits deemed acceptable. The control unit 154 manages the entire printing unit 122 and can, in this regard, be connected by cable to the individual elements, or else communicate telematically.

A possible variant may provide for the measurement of the product/process quality parameters for both the top and bottom surfaces of the strip 134.

Appropriately, the combined coat can be based on a polyester coating compatible with the subsequent application of the ink. In an exemplary embodiment, the following sequence of layers may be created on the strip: a first layer based on a combined polyester-based coat with a thickness of about 5-10 μm; an ink layer with a thickness of about 0.5-3 μm; and, finally, a clear coat with a thickness of about 10-20 μm.

The invention claimed is:

1. A plant for pre-coating and digital inkjet printing of a metallic strip comprising, in the following order:

(a) a first coating device for applying a combined coat that serves as both a primer and a base coat;

(b) a first oven for drying the coat;

(c) a first cooling system, such as an air and water cooling system;

(d) a digital sol-gel type inkjet printing unit, with an ink drying device;

(e) a second coating device, in particular a roller applicator, for applying a clear coat;

(g) a second cooling system, such as an air and water cooling system.

2. The pre-coating and printing plant according to claim 1, wherein said printing unit comprises, in the following order:

(d-1) one or more digital sol-gel type inkjet print heads;

(d-2) an ink drying oven;

(d-3) a third cooling system;

wherein upstream of said one or more print heads, is provided a centring system and a first strip tension control system, in particular comprising, in the following order:

(d-4) a rough strip centring system;

(d-5) a first "S-like" bridle system for controlling strip tension;

(d-6) a fine strip centring system;

(d-7) pass-line rollers and, optionally, deflectors;

wherein downstream of said one or more print heads, is provided a second strip tension control system, in particular:

(d-8) a second "S-like" bridle system.

3. The plant according to claim 2, further comprising in the printing unit a strip position sensor, and wherein the print heads are mounted onto a slide that can translate orthogonally to the direction of the strip's motion, and wherein the plant comprises a corresponding control unit configured to manage the movement of the slide according to the values as detected by the position sensor to compensate for the lateral deviation of the strip's position as measured by the position sensor.

4. The plant according to claim 3, wherein downstream of the printing unit and upstream of the second coating device, further comprising a strip temperature sensor, in particular a temperature transducer, adapted to measure the temperature of the strip and send the measured value to a corresponding control unit configured to control automatically the speed of the strip and/or the flow rate of the third cooling system so as to bring the temperature measured by the temperature sensor back within predetermined values.

5. The plant according to claim 2, wherein downstream of the printing unit and upstream of the second coating device, further comprising a strip temperature sensor, in particular a temperature transducer, adapted to measure the temperature of the strip and send the measured value to a corresponding control unit configured to control automatically the speed of the strip and/or the flow rate of the third cooling system so as to bring the temperature measured by the temperature sensor back within predetermined values.

6. A process for the pre-coating and printing, in particular digital inkjet printing, of a metallic strip, comprising the following steps, in the order indicated:

(I) application of a combined coat, that serves as both a primer and a base coat, onto a metallic strip;

(II) heat drying of the combined coat;

(III) cooling of the combined coat;

(IV) digital sol-gel type inkjet printing of the pre-coated strip and preferably drying of the ink;

(V) application of a clear coat onto the pre-coated and printed strip;

(VI) heat drying of the clear coat; and (VII) cooling of the clear coat.

7. The process according to claim 6, wherein before step (IV), said strip is centred and wherein before and after step (IV), said strip is tensioned.

8. The process according to claim 6, wherein said combined coat is polyester-melamine based.

9. The process according to claim 6, wherein said sol-gel type ink is a silane-based thermal polymerization product.

10. The process according to claim 6, wherein before step (IV), a measurement of the position of the strip takes place and wherein, during step (IV), the position of said one or more print heads is adjusted in order to optimize the application of ink onto the strip based on the measurement of the strip's position.

11. The process according to claim 6, wherein after step (IV), the temperature of the strip is monitored and wherein if the temperature exceeds a limit value, the speed of the strip is slowed down and/or the drying of the ink is enhanced in order to regulate the drying of the ink before application of the clear coat in step (V).

12. A plant for pre-coating and digital inkjet printing of a metallic strip comprising, in the following order:

(a) a first coating device for applying a combined coat that serves as both a primer and a base coat;

(b) a first oven for drying the coat;

(c) a first cooling system, such as an air and water cooling system;

(d) a digital sol-gel type inkjet printing unit, preferably with an ink drying device;

(e) a second coating device, in particular a roller applicator, for applying a clear coat;

(g) a second cooling system, such as an air and water cooling system, wherein said combined coat is polyester-melamine based, and wherein said sol-gel type ink is a silane-based thermal polymerization product.

* * * * *